US012332928B2

United States Patent
Williams et al.

(10) Patent No.: US 12,332,928 B2
(45) Date of Patent: Jun. 17, 2025

(54) SYSTEMS AND METHODS FOR ANALYSIS OF USER TELEMATICS DATA USING GENERATIVE AI

(71) Applicant: STATE FARM MUTUAL AUTOMOBILE INSURANCE COMPANY, Bloomington, IL (US)

(72) Inventors: Aaron Williams, Congerville, IL (US); Scott T. Christensen, Salem, OR (US); Ryan Gross, Normal, IL (US); Joseph P. Harr, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/196,691

(22) Filed: May 12, 2023

(65) Prior Publication Data
US 2024/0289362 A1    Aug. 29, 2024

Related U.S. Application Data

(60) Provisional application No. 63/460,675, filed on Apr. 20, 2023, provisional application No. 63/453,604, (Continued)

(51) Int. Cl.
*G06F 16/33* (2019.01)
*G06F 16/3329* (2025.01)
(Continued)

(52) U.S. Cl.
CPC ......... *G06F 16/3329* (2019.01); *G06Q 40/08* (2013.01); *G06Q 50/01* (2013.01)

(58) Field of Classification Search
CPC ..... G06F 16/3329; G06Q 40/08; G06Q 50/01
(Continued)

(56) References Cited

U.S. PATENT DOCUMENTS 7,698,342 B1    4/2010  Evans et al.
8,095,393 B2    1/2012  Seifert et al.
(Continued)

FOREIGN PATENT DOCUMENTS

CA    3227939 A1    2/2023
CN    112164391 A    1/2021
(Continued)

OTHER PUBLICATIONS

The Future of Car Insurance #2: How AI Is Transforming Auto Insurance for Companies and Drivers, Brogan Woodburn, Rashawn Mitchner, dated Jun. 22, 2023. (Year: 2023).*
(Continued)

*Primary Examiner* — Hai Tran
(74) *Attorney, Agent, or Firm* — MARSHALL, GERSTEIN & BORUN LLP

(57) ABSTRACT

Systems and methods are described for analyzing user data to generate a dialogue output. The method may include: (1) receiving, by one or more processors, an indication of a user identity for a user at a generative artificial intelligence (AI) model; (2) retrieving, by the one or more processors and based upon at least the user identity, user data from one or more publicly accessible sources; (3) determining, by the one or more processors and based upon at least the user data, one or more personalization characteristics associated with at least an information retention rate for the user via the generative AI model; and (4) generating, by the one or more processors and based upon at least the one or more personalization characteristics, a personalized dialogue output (or visual or virtual output for display) for the user via the generative AI model.

20 Claims, 7 Drawing Sheets

Related U.S. Application Data filed on Mar. 21, 2023, provisional application No. 63/450,224, filed on Mar. 6, 2023, provisional application No. 63/447,983, filed on Feb. 24, 2023.

(51) Int. Cl.
   *G06Q 40/08* (2012.01)
   *G06Q 50/00* (2012.01)

(58) Field of Classification Search
   USPC .......................................................... 705/4
   See application file for complete search history.

(56) References Cited

U.S. PATENT DOCUMENTS

| | | |
|---|---|---|
| 8,346,563 B1 | 1/2013 | Hjelm et al. |
| 9,830,748 B2 | 11/2017 | Rosenbaum |
| 9,990,782 B2 | 6/2018 | Rosenbaum |
| 10,043,217 B1 | 8/2018 | Bolden et al. |
| 10,055,793 B1 | 8/2018 | Call et al. |
| 10,181,159 B1 | 1/2019 | Allen et al. |
| 10,269,190 B2 | 4/2019 | Rosenbaum |
| 10,387,966 B1 | 8/2019 | Shah et al. |
| 10,467,824 B2 | 11/2019 | Rosenbaum |
| 10,482,554 B1 | 11/2019 | Vukich et al. |
| 10,535,104 B1 | 1/2020 | Mitchell et al. |
| 10,635,751 B1 | 4/2020 | Relangi et al. |
| 10,679,296 B1 | 6/2020 | Devereaux et al. |
| 10,769,953 B1 | 9/2020 | Salles et al. |
| 11,038,821 B1 | 6/2021 | Harding et al. |
| 11,127,081 B1 | 9/2021 | Kullman et al. |
| 11,227,452 B2 | 1/2022 | Rosenbaum |
| 11,250,515 B1 | 2/2022 | Feiteira et al. |
| 11,407,410 B2 | 8/2022 | Rosenbaum |
| 11,518,391 B1 | 12/2022 | Sanchez |
| 11,524,707 B2 | 12/2022 | Rosenbaum |
| 11,594,083 B1 | 2/2023 | Rosenbaum |
| 11,669,907 B1 | 6/2023 | Behrens et al. |
| 11,720,903 B1 | 8/2023 | Henryson et al. |
| 11,757,807 B2 | 9/2023 | Bhardwaj et al. |
| 11,790,296 B1 | 10/2023 | Henryson et al. |
| 11,818,111 B1 | 11/2023 | Debolt |
| 11,836,805 B1 | 12/2023 | Culbertson et al. |
| 11,837,004 B1 | 12/2023 | Agrahari et al. |
| 11,922,515 B1 | 3/2024 | Lombard et al. |
| 12,087,152 B1 | 9/2024 | Buentello et al. |
| 2001/0027403 A1 | 10/2001 | Peterson et al. |
| 2002/0002475 A1 | 1/2002 | Freedman et al. |
| 2002/0112011 A1 | 8/2002 | Washington |
| 2009/0125320 A1 | 5/2009 | Bickett |
| 2009/0240531 A1 | 9/2009 | Hilborn |
| 2009/0287509 A1 | 11/2009 | Basak et al. |
| 2010/0145734 A1 | 6/2010 | Becerra et al. |
| 2011/0119574 A1 | 5/2011 | Rogers et al. |
| 2011/0295623 A1 | 12/2011 | Behringer et al. |
| 2011/0313794 A1 | 12/2011 | Feeney |
| 2012/0101852 A1 | 4/2012 | Albert |
| 2012/0124485 A1 | 5/2012 | Scherpa et al. |
| 2012/0143634 A1 | 6/2012 | Beyda et al. |
| 2012/0303390 A1 | 11/2012 | Brook et al. |
| 2013/0204619 A1 | 8/2013 | Berman et al. |
| 2013/0218603 A1 | 8/2013 | Hagelstein et al. |
| 2013/0226624 A1 | 8/2013 | Blessman et al. |
| 2014/0094991 A1 | 4/2014 | Bouillet et al. |
| 2014/0222469 A1 | 8/2014 | Stahl et al. |
| 2014/0358731 A1 | 12/2014 | Itte et al. |
| 2014/0379385 A1 | 12/2014 | Duncan et al. |
| 2015/0170288 A1 | 6/2015 | Harton et al. |
| 2015/0213556 A1 | 7/2015 | Haller, Jr. |
| 2015/0339759 A1 | 11/2015 | Pope et al. |
| 2016/0041069 A1 | 2/2016 | Huang et al. |
| 2016/0071217 A1 | 3/2016 | Edwards et al. |
| 2016/0273181 A1 | 9/2016 | Smith |
| 2017/0004508 A1 | 1/2017 | Mansfield et al. |
| 2017/0103346 A1 | 4/2017 | Bodell et al. |
| 2017/0132643 A1 | 5/2017 | Sagade et al. |
| 2017/0132666 A1 | 5/2017 | Slavin |
| 2018/0082683 A1 | 3/2018 | Chen et al. |
| 2018/0173999 A1 | 6/2018 | Renard |
| 2018/0293660 A1 | 10/2018 | Rakshe et al. |
| 2018/0334176 A1 | 11/2018 | Park |
| 2019/0037077 A1 | 1/2019 | Konig et al. |
| 2019/0095822 A1 | 3/2019 | Rugel et al. |
| 2019/0114715 A1 | 4/2019 | Hessinger et al. |
| 2019/0122121 A1 | 4/2019 | Yu |
| 2019/0306327 A1 | 10/2019 | Matysiak et al. |
| 2019/0332661 A1 | 10/2019 | Halprin et al. |
| 2020/0042649 A1 | 2/2020 | Bakis et al. |
| 2020/0104876 A1 | 4/2020 | Chintakindi et al. |
| 2020/0154170 A1 | 5/2020 | Wu et al. |
| 2020/0167134 A1 | 5/2020 | Dey et al. |
| 2020/0210490 A1 | 7/2020 | Hutchins |
| 2020/0274962 A1 | 8/2020 | Martin et al. |
| 2020/0285225 A1 | 9/2020 | Lankehanumaiah et al. |
| 2020/0339160 A1 | 10/2020 | Rosenbaum |
| 2021/0064932 A1 | 3/2021 | Wang et al. |
| 2021/0073330 A1 | 3/2021 | Inagaki et al. |
| 2021/0117923 A1 | 4/2021 | Gray et al. |
| 2021/0152496 A1 | 5/2021 | Kim et al. |
| 2021/0200950 A1 | 7/2021 | Basu et al. |
| 2021/0203784 A1 | 7/2021 | Konig et al. |
| 2021/0256616 A1 | 8/2021 | Surti et al. |
| 2021/0271820 A1 | 9/2021 | Raghupatruni et al. |
| 2021/0295203 A1 | 9/2021 | Liao et al. |
| 2021/0357771 A1 | 11/2021 | Flowers et al. |
| 2021/0357790 A1 | 11/2021 | Volkov et al. |
| 2021/0365955 A1 | 11/2021 | Galante et al. |
| 2021/0374092 A1 | 12/2021 | Sahay |
| 2021/0383494 A1 | 12/2021 | Leise et al. |
| 2021/0390950 A1 | 12/2021 | Kumar et al. |
| 2022/0004630 A1 | 1/2022 | Almukaynizi et al. |
| 2022/0091957 A1 | 3/2022 | Szczepanik et al. |
| 2022/0092893 A1 | 3/2022 | Rosenbaum |
| 2022/0094789 A1 | 3/2022 | Lau et al. |
| 2022/0176971 A1 | 6/2022 | Nordh |
| 2022/0198531 A1 | 6/2022 | Cleaver et al. |
| 2022/0261535 A1 | 8/2022 | Madaan et al. |
| 2022/0269583 A1 | 8/2022 | Plawecki |
| 2022/0279014 A1 | 9/2022 | Stokes et al. |
| 2022/0293107 A1 | 9/2022 | Leaman et al. |
| 2022/0300993 A1 | 9/2022 | Chaudhry et al. |
| 2022/0308943 A1 | 9/2022 | Srinivasan et al. |
| 2022/0340148 A1 | 10/2022 | Rosenbaum |
| 2023/0005070 A1 | 1/2023 | Nguyen et al. |
| 2023/0017739 A1 | 1/2023 | Feldman et al. |
| 2023/0023869 A1 | 1/2023 | Ganesan et al. |
| 2023/0060300 A1 | 3/2023 | Rosenbaum |
| 2023/0064816 A1 | 3/2023 | Matsuoka et al. |
| 2023/0108454 A1 | 4/2023 | Gidwaney et al. |
| 2023/0110941 A1 | 4/2023 | Makhija et al. |
| 2023/0116639 A1 | 4/2023 | Patt et al. |
| 2023/0140931 A1 | 5/2023 | Anderson et al. |
| 2023/0141853 A1 | 5/2023 | Vu et al. |
| 2023/0244938 A1 | 8/2023 | Wei et al. |
| 2023/0267512 A1 | 8/2023 | Isackson et al. |
| 2023/0290502 A1 | 9/2023 | Zhi et al. |
| 2023/0298567 A1 | 9/2023 | Tan et al. |
| 2023/0316412 A1 | 10/2023 | Behrens et al. |
| 2023/0343149 A1 | 10/2023 | Volos et al. |
| 2023/0410801 A1 | 12/2023 | Mishra |
| 2024/0073219 A1* | 2/2024 | Maizels ................ G10L 15/25 |
| 2024/0119424 A1 | 4/2024 | Lofvers et al. |
| 2024/0248920 A1 | 7/2024 | Qiao et al. |
| 2024/0249557 A1 | 7/2024 | Chavali |
| 2024/0256780 A1 | 8/2024 | Douglas et al. |
| 2024/0371367 A1 | 11/2024 | Churgin et al. |
| 2025/0013555 A1 | 1/2025 | Papadopoulos et al. |

FOREIGN PATENT DOCUMENTS

| | | |
|---|---|---|
| EP | 3239686 A1 | 11/2017 |
| EP | 3578433 B1 | 8/2020 |
| EP | 3730375 B1 | 10/2021 |
| EP | 3960576 A1 | 3/2022 |

(56) References Cited

FOREIGN PATENT DOCUMENTS

| EP | 4190659 A1 | 6/2023 |
|---|---|---|
| EP | 4190660 A1 | 6/2023 |
| KR | 10-2148616 B1 | 8/2020 |
| WO | 2013/059620 A2 | 4/2013 |

OTHER PUBLICATIONS

STIC EIC Search Report for U.S. Appl. No. 18/196,691 (Year: 2024).*

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Munk, Will AI models like ChatGPT take your insurance job?, Life Annuity Speciality (published Mar. 7, 2023).

Rengachary et al., ChatGPT: a Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Wilson, Should Financial Services Companies Consider Open AI?, LIMRA.com MarketFacts (published Mar. 2023).

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-agent-m-generative-ai-llm>. Retrieved from Internet on Aug. 1, 2023.

Wang et al., Transfer learning-based query classification for intelligent building information spoken dialogue. Automation in Construction. Sep. 1, 2022; 141:104403. (Year: 2022).

* cited by examiner

SYSTEMS AND METHODS FOR ANALYSIS OF USER TELEMATICS DATA USING GENERATIVE AI

CROSS-REFERENCE TO RELATED APPLICATIONS

This application claims priority to and the benefit of the filing date of provisional U.S. Patent Application No. 63/447,983 entitled "SYSTEMS AND METHODS FOR ANALYSIS OF USER TELEMATICS DATA USING GENERATIVE AI," filed on Feb. 24, 2023; provisional U.S. Patent Application No. 63/450,224 entitled "SYSTEMS AND METHODS FOR ANALYSIS OF USER TELEMATICS DATA USING GENERATIVE AI," filed on Mar. 6, 2023; provisional U.S. Patent Application No. 63/453,604 entitled "SYSTEMS AND METHODS FOR ANALYSIS OF USER TELEMATICS DATA USING GENERATIVE AI," filed on Mar. 21, 2023; and provisional U.S. Patent Application No. 63/460,675 entitled "SYSTEMS AND METHODS FOR ANALYSIS OF USER TELEMATICS DATA USING GENERATIVE AI," filed on Apr. 20, 2023. The entire contents of the provisional applications are hereby expressly incorporated herein by reference.

FIELD OF THE DISCLOSURE

Systems and methods are disclosed for using gathering and analyzing user data, as well as generating a personalized output dialogue based upon personal characteristics of the user determined from the user data.

BACKGROUND

Current systems for analyzing and accessing data may be cumbersome and/or difficult to understand for a user. For example, when generating a work product using user data, a system may simply generate the end product broadly without tailoring information to a user, which may cause resources to be wasted as unnecessary information is provided to the user. Alternatively, the system may direct a user to a human element to answer particular questions associated with the user, which may cause additional difficulties and wasted resources based upon repeated information requirements, timing, miscommunication, misunderstanding, etc.

In addition, current systems for generating, developing, and presenting data to a user may not account for nuances in language and user interpretation. For example, current systems may generate public-facing data, such as questions to determine particular data for a user during a phone call, based upon past feedback, but may not properly parse the feedback in question. For instance, when generating or modifying questions based upon past feedback, a current system may rely more on numerical feedback or particular keywords rather than on the totality of the dialogue.

The systems and methods disclosed herein provide solutions to these problems and may provide solutions to the ineffectiveness, insecurities, difficulties, inefficiencies, encumbrances, and/or other drawbacks of conventional techniques.

SUMMARY

The present embodiments may relate to, inter alia, accurately and efficiently identifying impact factors in internal data and generating output dialogue associated with such. Systems and methods that may generate work product based upon the impact factors in the internal data are also provided.

In one aspect, a computer-implemented method for analyzing user data may be provided. The method may be implemented via one or more local or remote processors, servers, sensors, transceivers, memory units, mobile devices, wearables, smart glasses, augmented reality glasses, virtual reality glasses, smart contacts, mixed or extended reality glasses or headsets, voice bots, chatbots, ChatGPT bots, ChatGPT-related bots, and/or other electronic or electrical components, which may be in wired or wireless communication with one another. For example, in one instance, the method may include: (1) receiving, by one or more processors, an indication of a user identity for a user at a generative artificial intelligence (AI) model; (2) retrieving, by the one or more processors and based upon at least the user identity, user data from one or more publicly accessible sources; (3) determining, by the one or more processors and based upon at least the user data, one or more personalization characteristics associated with at least an information retention rate for the user via the generative AI model; and/or (4) generating, by the one or more processors and based upon at least the one or more personalization characteristics, a personalized dialogue output (or visual or virtual output for display) for the user via the generative AI model. The method may include additional, less, or alternate actions and functionality, including that discussed elsewhere herein.

For instance, the computer-implemented method may include: retrieving, by the one or more processors and based upon at least the user identity, interaction data between the user and one or more other individuals from one or more publicly accessible sources; wherein determining the one or more personalization characteristics is further based upon at least the interaction data.

The personalized dialogue output for the user may include a personalized modification (e.g., a discount or surcharge) to an insurance premium based upon at least one of the user data or the interaction data. Further, the indication of the user identity may include at least one of (i) a phone call, (ii) a video call, (iii) a text message, or (iv) an email, and the personalized dialogue output for the user may include a summary of one or more predetermined call topics, wherein the summary is personalized to relate to the user.

Moreover, the personalized dialogue output for the user may include one or more visuals depicting the one or more personalization characteristics and generated by the generative AI model. Additionally or alternatively, the personalized dialogue output for the user may include one or more audio cues, wherein the one or more audio cues are based upon at least the personalization characteristics and generated by the generative AI model.

Further, the one or more publicly accessible sources may include at least one of (i) social media, (ii) governmental databases, or (iii) online posts by the user. Moreover, the generative AI model may include at least one of: (i) an AI or machine learning (ML) chatbot or (ii) an AI or ML voice bot.

In another aspect, a computer system for analyzing user data may be provided. The computer system may include one or more local or remote processors, servers, sensors, transceivers, memory units, mobile devices, wearables, smart glasses, augmented reality glasses, virtual reality glasses, smart contacts, mixed or extended reality glasses or headsets, voice bots, chatbots, ChatGPT bots, ChatGPT-related bots, and/or other electronic or electrical components, which may be in wired or wireless communication with one another. For example, in one instance, the computer system may include one or more processors; a communication unit; and a non-transitory computer-readable medium coupled to the one or more processors and the communication unit and storing instructions thereon that, when executed by the one or more processors, cause the computing device to: (1) receive an indication of a user identity for a user at a generative artificial intelligence (AI) model; (2) retrieve, based upon at least the user identity, user data from one or more publicly accessible sources; (3) determine, based upon at least the user data, one or more personalization characteristics associated with at least an information retention rate for the user via the generative AI model; and/or (4) generate, based upon at least the one or more personalization characteristics, a personalized dialogue output (or visual or virtual output for display) for the user via the generative AI model. The computing device may include additional, less, or alternate functionality, including that discussed elsewhere herein.

In another aspect, a tangible, non-transitory computer-readable medium storing instructions for analyzing user data may be provided. The non-transitory computer-readable medium stores instructions that, when executed by one or more processors of a computing device, cause the computing device to: (1) receive an indication of a user identity for a user at a generative artificial intelligence (AI) model; (2) retrieve, based upon at least the user identity, user data from one or more publicly accessible sources; (3) determine, based upon at least the user data, one or more personalization characteristics associated with at least an information retention rate for the user via the generative AI model; and/or (4) generate, based upon at least the one or more personalization characteristics, a personalized dialogue output (or visual or virtual output) for the user via the generative AI model. The computer-readable instructions may include instructions that provide additional, less, or alternate functionality, including that discussed elsewhere herein.

In another aspect, a computer-implemented method for analyzing user data may be provided. The method may be implemented via one or more local or remote processors, servers, sensors, transceivers, memory units, mobile devices, wearables, smart glasses, augmented reality glasses, virtual reality glasses, smart contacts, mixed or extended reality glasses or headsets, voice bots, chatbots, ChatGPT bots, ChatGPT-related bots, and/or other electronic or electrical components, which may be in wired or wireless communication with one another. For example, in one instance, the method may include: (1) receiving, by one or more processors, an indication of a user identity for a user at a machine learning (ML) model; (2) retrieving, by the one or more processors and based upon at least the user identity, user data from one or more publicly accessible sources; (3) determining, by the one or more processors and based upon at least the user data, one or more personalization characteristics associated with at least an information retention rate for the user via the ML model; and/or (4) generating, by the one or more processors and based upon at least the one or more personalization characteristics, a personalized dialogue output (or visual or virtual output for display) for the user via the ML model. The method may include additional, less, or alternate actions and functionality, including that discussed elsewhere herein.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

Figure 1:
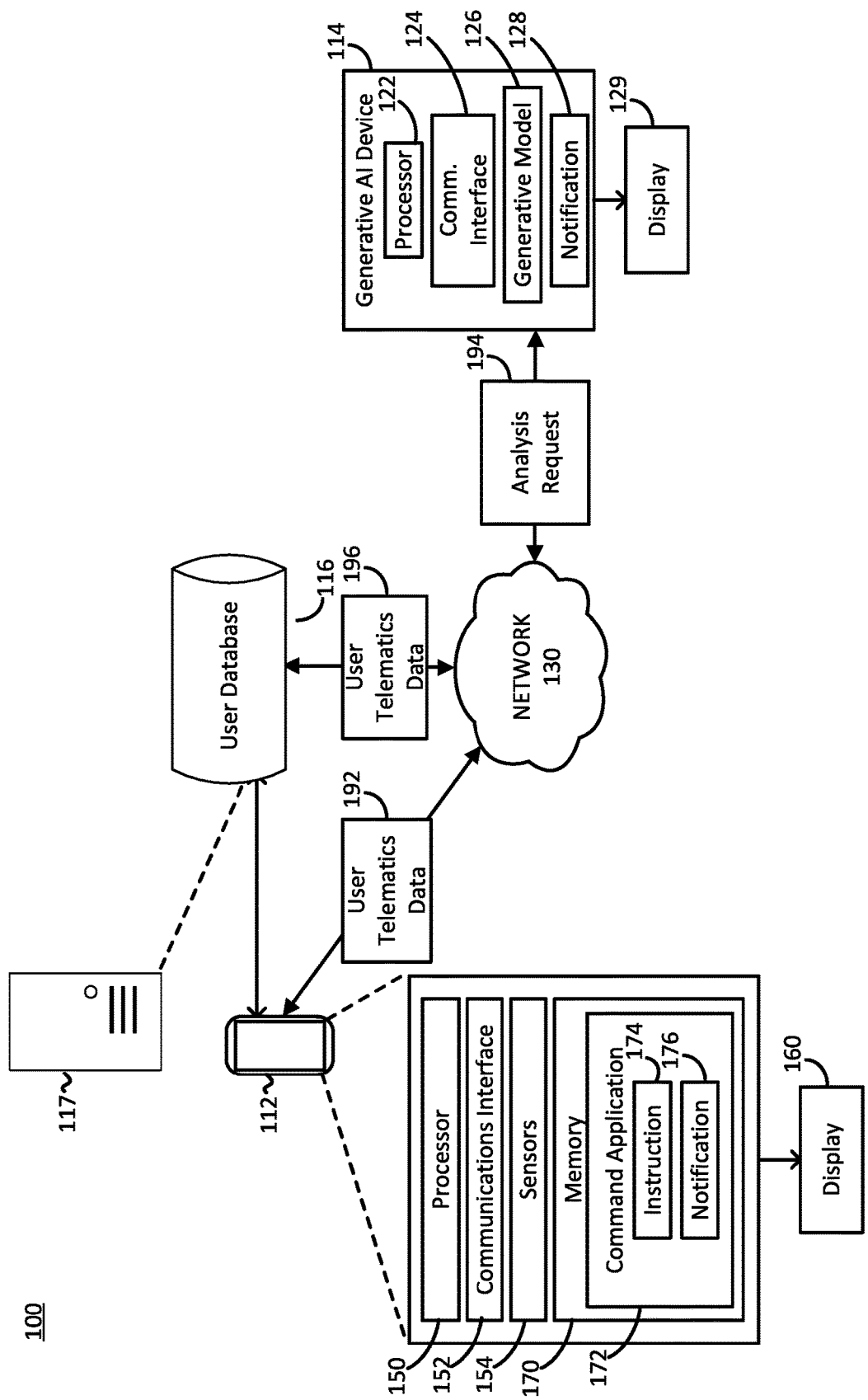
FIG. 1 depicts an exemplary computer system that facilitates communication, data gathering, and analysis via a generative device implementing a generative artificial intelligence and/or machine learning model.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for, inter alia, analyzing data (e.g., user telematics data) using a generative artificial intelligence (AI) and/or machine learning (ML) model. For example, a system may receive user telematics data associated with customer feedback information, market feedback information, project information, user preferences, etc.

A generative AI may be used to analyze customer data by pulling publicly available data regarding a user from the internet, such as social media information, public records, etc. Similarly, the generative AI may pull interaction data (e.g., social media pages, criminal records, public communication logs, etc.) between sources to determine potential behavioral influences. The generative AI may generate personalized visuals or details for the user to improve user information intake and retention. For example, the generative AI may summarize standard call information for a consumer and personalize the information to relate the data to the user.

In some embodiments, the generative artificial intelligence (AI) models (also referred to as generative machine learning (ML) models) including voice bots or chatbots discussed herein may be configured to utilize artificial intelligence and/or machine learning techniques. For instance, the voice or chatbot may be a ChatGPT chatbot. The voice or chatbot may employ supervised or unsupervised machine learning techniques, which may be followed or used in conjunction with reinforced or reinforcement learning techniques. The voice or chatbot may employ the techniques utilized for ChatGPT. The voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption.

Noted above, in some embodiments, a chatbot or other computing device may be configured to implement machine learning, such that server computing device "learns" to analyze, organize, and/or process data without being explicitly programmed. Machine learning may be implemented through machine learning ("ML") methods and algorithms ("ML methods and algorithms"). In one exemplary embodiment, a machine learning module ("ML module") may be configured to implement ML methods and algorithms.

As used herein, a chat or voice bot (referred to broadly as "chatbot") may refer to a specialized system for implementing, training, utilizing, and/or otherwise providing an AI or ML model to a user for dialogue interaction (e.g., "chatting"). Depending on the embodiment, the chatbot may utilize and/or be trained according to language models, such as natural language processing (NLP) models and/or large language models (LLMs). Similarly, the chatbot may utilize and/or be trained according to generative adversarial network techniques, as described in more detail below with regard to FIGS. 2A and 2B.

The chatbot may receive inputs from a user via text input, spoken input, gesture input, etc. The chatbot may then use AI and/or ML techniques as described herein to process and analyze the input before determining an output and displaying the output to the user. Depending on the embodiment, the output may be in a same or different form than the input (e.g., spoken, text, gestures, etc.), may include images, and/or may otherwise communicate the output to the user in an overarching dialogue format.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes exemplary inputs and associated exemplary outputs. Based upon the training data, the ML module may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiment, a processing element may be trained by providing it with a large sample of data with known characteristics or features.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

Exemplary Computer System for Detecting, Predicting, and/or Responding to Malfunctions in a Heating System FIG. 1 depicts an exemplary computer system 100 for analyzing user telematics data to generate a personalized output via generative artificial intelligence (AI) and/or machine learning (ML) model(s), in accordance with various aspects of the present disclosure. An entity, such as a user or an insurance company, may wish to use a generative AI or ML model to determine how an individual will react to information, a project, a product, a PR (public relations) campaign, etc.

The user data (e.g., user telematics data) may include data from the user's mobile device, or other computing devices, such as smart glasses, wearables, smart watches, laptops, smart glasses, augmented reality glasses, virtual reality headsets, etc. The user data or user telematics data may include data associated with the movement of the user, such as GPS or other location data, and/or other sensor data, including camera data or images acquired via the mobile or other computing device. In some embodiments, the user data and/or user telematics data may include historical data related to the user, such as historical home data, historical claim data, historical accident data, etc. In further embodiments, the user data and/or user telematics data may include present and/or future data, such as expected occupancy data, projected claim data, projected accident data, etc. Depending on the embodiment, the historical user data and the present and/or future data may be related.

The user data or user telematics data may also include home telematics data collected or otherwise generated by a home telematics app installed and/or running on the user's mobile device or other computing device. For instance, a home telematics app may be in communication with a smart home controller (e.g., for controlling a heating/HVAC system) and/or smart lights, smart appliances or other smart devices situated about a home and may collect data from the interconnected smart devices and/or smart home sensors. Depending on the embodiment, the user telematics data and/or the home telematics data may include information input by the user at a computing device or at another device associated with the user. In further embodiments, the user telematics data and/or the home telematics data may only be collected or otherwise generated after receiving a confirmation from the user, although the user may not directly input the data. Additionally or alternatively, the user data and/or the home telematics data may include electric device usage data, electricity usage data, water usage date, electric meter data, water meter data, etc.

Mobile device 112 may be associated with (e.g., in the possession of, configured to provide secure access to, etc.) a particular user, who may provide a response to an inquiry (e.g., a survey) to a database, such as user database 116. Mobile device 112 may be a personal computing device of that user, such as a mobile device, smartphone, a tablet, smart contacts, smart glasses, smart headset (e.g., augmented reality, virtual reality, or extended reality headset or glasses), smart watch, wearable, or any other suitable device or combination of devices (e.g., a smart watch plus a smartphone) with wireless communication capability. In the embodiment of FIG. 1, mobile device 112 may include a processor 150, a communications interface 152, sensors 154, a memory 170, and a display 160.

Processor 150 may include any suitable number of processors and/or processor types. Processor 150 may include one or more CPUs and one or more graphics processing units (GPUs), for example. Generally, processor 150 may be configured to execute software instructions stored in memory 170. Memory 170 may include one or more persistent memories (e.g., a hard drive and/or solid state memory) and may store one or more applications, including command application 172.

The mobile device 112 may be communicatively coupled to a computing device 117 associated with the user database 116. For example, the mobile device 112 and computing device 117 associated with the user database 116 may communicate via USB, Bluetooth, Wi-Fi Direct, Near Field Communication (NFC), etc. In other embodiments, mobile device 112 may obtain data from the user database 116 from sensors 154 within the mobile device 112.

Further still, mobile device 112 may obtain the user telematics data via a user interaction with a display 160 of the mobile device 112. For example, a user may respond via the display 160 to a survey or interact with the generative device 114 via the display 160. The mobile device 112 may then generate a communication that may include the user telematics data.

Depending on the embodiment, a computing device 117 associated with the user database 116 may obtain user telematics data for the user database 116 indicative of user responses, survey information, and/or other interaction data. In other embodiments, the computing device 117 associated with the user database 116 may obtain user telematics data through interfacing with a mobile device 112.

In some embodiments, the user telematics data may include interpretations of raw data, such as analysis of survey data. Also, in some embodiments, computing device 117 associated with the user database 116 and/or mobile device 112 may generate and transmit communications periodically (e.g., every minute, every hour, every day), where each communication may include a different set of user telematics data collected over a most recent time period. In other embodiments, computing device 117 associated with the user database 116 and/or mobile device 112 may generate and transmit communications as the mobile device 112 and/or computing device 117 associated with the user database 116 receive new user telematics data.

In some embodiments, generating the communication 196 may include (i) obtaining identity data for the computing device 117 and/or the user database 116; (ii) obtaining identity data for the mobile device 112 in the user database 116; and/or (iii) augmenting the communication 196 with the identity data for the user database 116, the computing device 117, and/or the mobile device 112. The communication 196 may include user telematics data.

In further embodiments, a generative device 114 may receive and/or transmit data related to an analysis request 194 via the network 130. Depending on the embodiment, the generative device may include one or more processors 122, a communications interface 124, a generative model module 126, a notification module 128, and a display 129. In some embodiments, each of the one or more processors 122, communications interface 124, generative model module 126, notification module 128, and display 129 may be similar to the components described above with regard to the mobile device 112.

The mobile device 112 and the computing device 117 associated with the user database 116 may be associated with the same user. Mobile device 112, and optionally the computing device 117 associated with the user database 116, may be communicatively coupled to generative device 114 via a network 130. Network 130 may be a single communication network, or may include multiple communication networks of one or more types (e.g., one or more wired and/or wireless local area networks (LANs), and/or one or more wired and/or wireless wide area networks (WANs) such as the internet). In some embodiments, the generative device 114 may connect to the network 130 via a communications interface 124 much like mobile device 112.

While FIG. 1 shows only one mobile device 112, it is understood that many different mobile devices (of different users), each similar to mobile device 112, may be in remote communication with network 130. Additionally, while FIG. 1 shows only one user database 116 and associated computing device 117, it is understood that many servers and/or databases, each similar to user database 116, may include computing devices 117 that are in remote communication with network 130.

Further, while FIG. 1 shows only one generative device 114, it is understood that many different generative devices, each similar to generative device 114, may be in remote communication with network 130. Generative device 114 and/or any other similar generative device may be associated with an insurance company, a regulator organization, a property rental company, and/or a similar organization.

Exemplary Machine Learning

Optionally, the system 100 may determine particular data using a machine learning (and/or artificial intelligence) model for data evaluation. The machine learning model may be trained based upon a plurality of sets of user telematics data, and corresponding determinations. The machine learning model may use the user telematics data to generate the determinations as described herein. In some embodiments, the machine learning model may be or include a generative AI or ML model as described with regard to FIGS. 2A and 2B. In further embodiments, the machine learning model may perform some determinations as described herein while others are performed by a generative AI or ML model as described with regard to FIGS. 2A and 2B.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

Some embodiments described herein may include automated machine learning to determine risk levels, identify relevant risk factors, evaluate home telematics data and/or user telematics data, identify environmental risk factors, identify locale-based risk factors, identify heating system risk factors, identify plumbing risk factors, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, which may be followed by or used in conjunction with reinforced or reinforcement learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as weather data, operation data, customer financial transaction, location, browsing or online activity, mobile device, vehicle, and/or home sensor data) in order to facilitate making predictions for subsequent customer data. Models may be created based upon example inputs of data in order to make valid and reliable predictions for novel inputs.

Additionally or alternatively, the machine learning programs may be trained by inputting sample data sets or certain data into the programs, such as mobile device, server, or home system sensor and/or control signal data, and other data discussed herein. The machine learning programs may utilize deep learning algorithms that are primarily focused on pattern recognition and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated. These techniques may be followed by reinforced or reinforcement learning techniques.

The machine learning programs may be trained with smart device-mounted, home-mounted, and/or mobile device-mounted sensor data to identify certain user telematics data, such as analyzing home telematics data and/or user telematics data to identify and/or determine environmental data, location data, first responder data, home structure data, occupancy data, water data, electricity data, water usage data, electricity usage data, usage data, a likelihood of pipe damage, and/or other such potentially relevant data. In some embodiments, the machine learning programs may be trained with irregularities such that the machine learning programs may be trained to match, compare, and/or otherwise identify impact factors based upon user telematics data. Depending on the embodiment, the machine learning programs may be initially trained according to such using example training data and/or may be trained while in operation using particular user telematics data.

After training, machine learning programs (or information generated by such machine learning programs) may be used to evaluate additional data. Such data may be related to publicly accessible data, such as building permits and/or chain of title. Other data may be related to privately-held data, such as insurance and/or claims information related to the property and/or items associated with the property. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

It will be understood that the above disclosure is one example and does not necessarily describe every possible embodiment. As such, it will be further understood that alternate embodiments may include fewer, alternate, and/or additional steps or elements.

Exemplary Systems for Detecting and Responding to Heating System Malfunctions

Figure 2A:
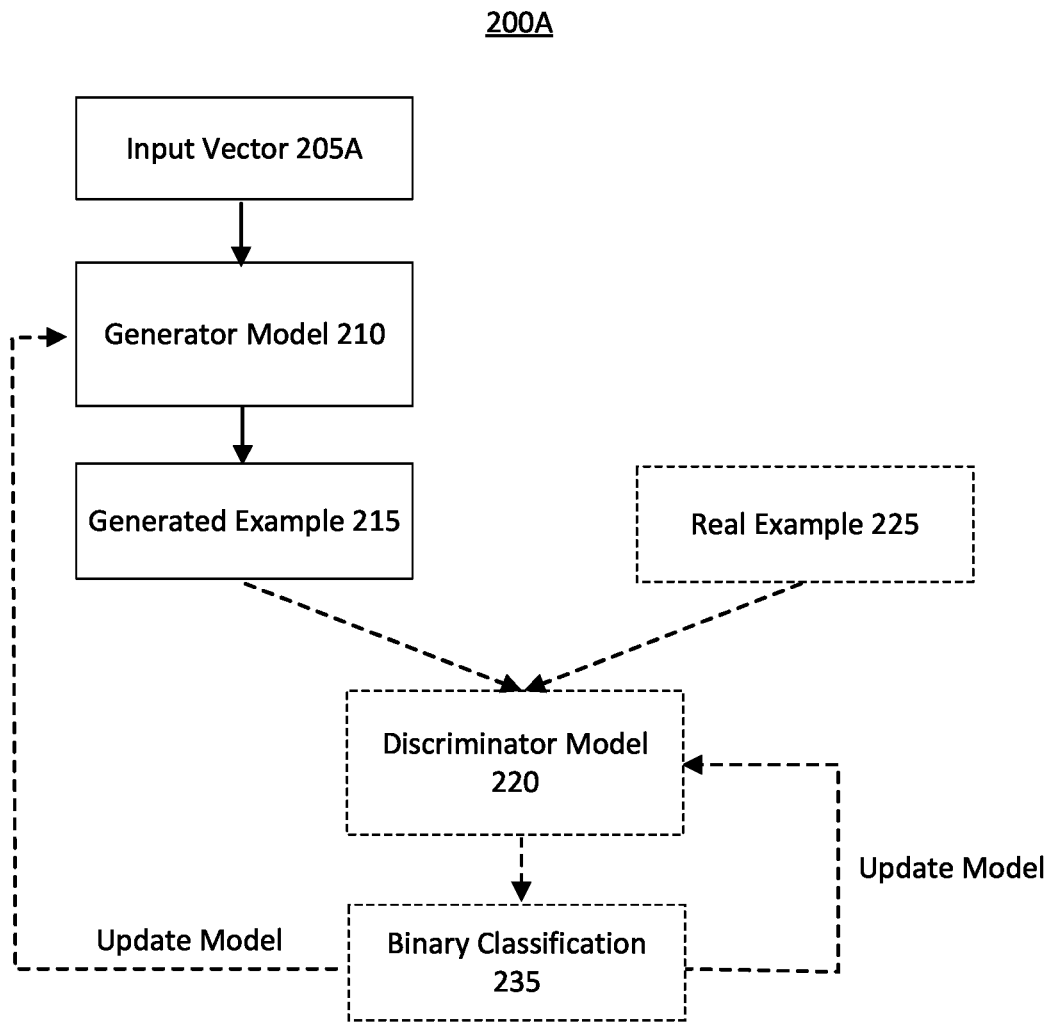
FIG. 2A depicts an exemplary artificial intelligence and/or machine learning model to be implemented in a generative device as described with regard to FIG. 1.

FIG. 2A illustrates an exemplary model 200A using generative AI and/or ML techniques. In particular, a generator model 210 and a discriminator model 220 receive inputs to generate a binary classification 235 and output text used to analyze internal entity data.

In particular, the generator model 210 receives an input vector 205A to generate a generated example 215. In some embodiments, the input vector 205A may be a fixed-length random vector. In further embodiments, the input vector 205A may be drawn randomly from a Gaussian distribution such that points in the vector space corresponding to the input vector 205A may correspond to points in the problem domain representative of the data distribution. Depending on the embodiment, the vector space corresponding to the input vector 205A may include one or more hidden variables (e.g., variables that are not directly observable). In some embodiments, the input vector 205A may be used to seed the generative process. Using the input vector 205A, the generator model 210 then generates a generated example 215.

In some embodiments, the discriminator model 220 may then receive the generated example 215 and/or a real example 225. The discriminator model 220 may generate a binary classification 235 denoting whether the received input is generated (e.g., the generated example 215) or real (e.g., the real example 225). The exemplary model 200A may additionally output an output product (e.g., dialogue, textual output, visual output, etc.) and/or use the binary classification 235 in training the generator model 210 and/or discriminator model 220.

In further embodiments, the generator model 210 and the discriminator model 220 may receive additional inputs and/ or information, such as a class value, a class label, modality data, etc. In some such embodiments, the additional information may function similarly to supervised machine learning techniques, and embodiments without the additional information may function similarly to unsupervised machine learning techniques.

In still further embodiments, the exemplary model 200A may use both the generator model 210 and the discriminator model 220 for training and may subsequently use only the generator model 210 for generative modeling as described herein.

In some embodiments, the generator model 210 and the discriminator model 220 are trained according to adversarial techniques (e.g., when the discriminator model 220 correctly generates the binary classification 235, the generator model 210 is updated and, when the discriminator model 220 incorrectly generates the binary classification 235, the discriminator model 220 is updated).

Depending on the embodiment, the generator model 210 and/or the discriminator model 220 may be or include neural networks, such as artificial neural networks (ANN), convolution neural networks (CNN), or recurrent neural networks (RNN). In further embodiments, the model 200A, the generator model 210, and/or the discriminator model 220 may incorporate, include, be, and/or otherwise use language model techniques (e.g., a large language model (LLM), natural language processing (NLP), etc.). Similarly, the model 200A, the generator model 210, and/or the discriminator model 220 may incorporate, include, be, and/or otherwise use a transformer architecture to utilize the appropriate language model techniques, as described with regard to FIG. 2B below.

Figure 2B:
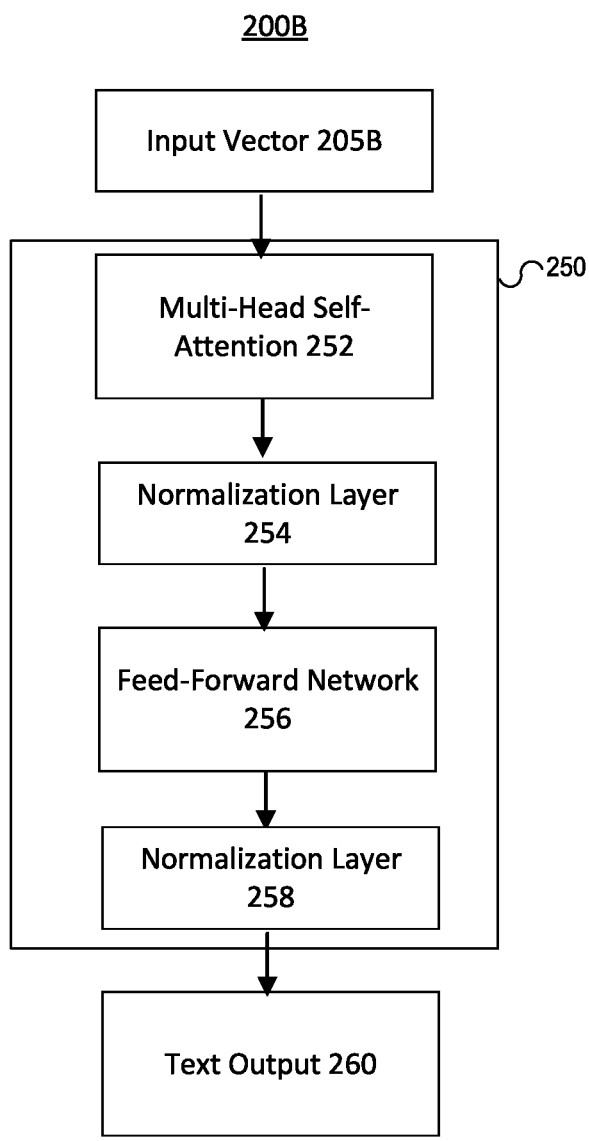
FIG. 2B depicts an exemplary large language model to be implemented in a generative device as described with regard to FIG. 1.

FIG. 2B illustrates an exemplary large language model 200B for training a generative model as described herein. In particular, a large language training module 250 receives an input vector 205B similar to input vector 205A and outputs a text output 260.

In particular, in some embodiments, the generative AI and/or ML model may be based upon an LLM trained to predict a word in a sequence of words. For example, the LLM may be trained to predict a next word following a given sequence of words (e.g., "next-token-prediction"), and/or trained to predict a "masked" (e.g., hidden) word within a sequence of given sequence of words (e.g., "masked-language-modeling"). For instance, in an example of next-token-prediction, the generative AI and/or ML model may be given the sequence "Jane is a"—and the generative AI and/or ML model may predict a next word, such as "dentist," "teacher," "mother," etc. In one example of masked-language-modeling, the generative AI and/or ML model may receive the given the sequence "Jane XYZ skiing"—and the generative AI and/or ML model may fill in XYZ with "loves," "fears," "enjoys," etc.

In some embodiments, this prediction technique is accomplished through a long-short-term-memory (LSTM) model, which may fill in the blank with the most statistically probable word based upon surrounding context. However, the LSTM model has the following two drawbacks. First, the LSTM model does not rate/value individual surrounding words more than others. For instance, in the masked-language-modeling example of the preceding paragraph, skiing may most often be associated with "enjoys;" however Jane in particular may fear skiing but the LSTM model is not able to correctly determine this. Second, instead of being processed as a whole, the words of the input sequence are processed individually and sequentially, thus restricting the complexity of the relationships that may be inferred between words and their meanings.

Advantageously, some embodiments overcome these drawbacks of the LSTM model by using transformers (e.g., by using a generative pre-trained transformer (GPT) model). More specifically, some embodiments use a GPT model that includes (i) an encoder that processes the input sequence, and (ii) a decoder that generates the output sequence. The encoder and decoder may both include a multi-head self-attention mechanism that allows the GPT model to differentially weight parts of the input sequence to infer meaning and context. In addition, the encoder may leverage masked-language-modeling to understand relationships between words and produce improved responses.

In particular, the input vector 205B may be a vector representative of relationships between words, phrases, etc. in the input. The large language training module 250 may include a self-attention block 252 component to attend to different parts of the input simultaneously or near-simultaneously to capture relationships and/or dependencies between the different parts of the input (e.g., referred to as a multi self-attention block, multi-head attention block, multi-head self-attention block, masked multi self-attention block, masked multi-head attention block, masked multi-head self-attention block, etc.). In particular, the self-attention block 252 relates different positions of a sequence to compute a representation of the sequence. As such, the self-attention block 252 may weigh an impact of different words in a sentence when sequencing. As such, the model 200B learns to give emphasis to different portions of an input vector 205B. Depending on the implementation, the self-attention block 252 may transform the input vector 205B into different sets (e.g., queries, keys, values, etc.). In some implementations, the self-attention block 252 may receive the input vector 205B already-transformed. The self-attention block 252 may then compute an attention score representing the impact of each word in the sentence with respect to the other words in the sentence (e.g., by taking a dot product between different vector sets). The output then proceeds to the normalization layer 254.

The normalization layer 254 may normalize the output of the self-attention block 252 (e.g., by applying a softmax function to normalize the scores).

Similarly, the self-attention block may subsequently output into a feed-forward network block 256, which performs a non-linear transformation to generate a new representation of the input and/or relationships between words, phrases, etc. In particular, the feed-forward network block 256 may compute a weighted sum of the vectors, using the calculated and normalized attention scores to capture the contextual relationships between words. In some implementations, the normalization layer 254 and/or the self-attention block 252 may perform the computation to generate a representation of the relationship between words, etc. After the feed-forward network block 256, an additional normalization layer 258 may normalize the respective output and/or add residual connection(s) to allow the output to move directly to another input. The model 200B may therefore learn which parts of an input are important (e.g., remain prevalent through the normalization process). Depending on the embodiment, the model 200B may repeat the process for the large language training module 250 1 time, 5 times, 10 times, N times, etc. to train the respective model(s).

Depending on the implementation, an encoder and/or a decoder may be trained as described above. In further implementations, the encoder is trained in accordance with the above, and a decoder includes an additional self-attention block (not shown) receiving the output of the encoder as well.

Furthermore, in some embodiments, rather than performing the previous four steps only once, the GPT model iterates the steps and performs them in parallel; at each iteration, new linear projection of the query, key, and value vectors are generated. Such iterative, parallel embodiments advantageously improve grasping of sub-meanings and more complex relationships within the input sequence data.

Further advantageously, some embodiments first train a basic model (e.g., a basic GPT model, etc.), and subsequently perform any of the following three steps on the basic model: supervised fine tuning (SFT); reward modeling; and/or reinforcement learning.

In the SFT step, a supervised training dataset is created. The supervised training dataset has known outputs for each input so that the model can learn from the correspondences between input and outputs. For example, to train the model to generate summary documents, the supervised training dataset may have: (a) inputs of (i) insurance company application (app) information, (ii) anonymized insurance claim information, (iii) police report information, and/or (iv) auxiliary information; and (b) outputs of summary documents.

In another example, to train the model to generate comparison documents, the supervised training dataset may have: (a) inputs of (i) summary documents, (ii) insurance company application (app) information, (iii) anonymized insurance claim information, (iv) police report information, and/or (v) auxiliary information; and (b) outputs of comparison documents.

In yet another example, to train the model to generate requests for information, the supervised training dataset may have: (a) inputs of indications of missing information (e.g., an administrator contacts the chatbot with the question "please draft an email requesting a police report corresponding to insurance claim XYZ"), and (b) outputs of requests for information (e.g., in the form of a draft email or other message to send to an administrator of the police reports database, or an email or other message that the chatbot sends directly to the administrator of the police reports database, etc.).

Training the basic model on the supervised training dataset may create the SFT model; and subsequent to creating the SFT model, the generative AI and/or ML model may be trained according to reward modeling. In reward modeling, the SFT may be fed input prompts, and may output multiple outputs (e.g., 2-10 outputs, etc.) for each input. The multiple outputs for each input may be achieved by, for example, randomness, or by controlling a predictability setting. A user may then rank the multiple outputs for each input, thus allowing the model to associate each output with a reward (e.g., a scalar value). And the ranked outputs may then be used to further train the SFT model. Similarly, the reward modeling may be performed as otherwise described herein.

Subsequently, the generative AI and/or ML model may further be trained via reinforcement learning. Here, further inputs are fed into the model, and the model then generates, based upon the policy learned during reward modeling, (i) outputs corresponding to the inputs, and (ii) rewards values (e.g., scalar values) corresponding to the input/output pairs. The rewards values may then be fed back into the model to further evolve the policy.

In some embodiments, the reward modeling and reinforcement learning steps may be iterated any number of times.

It will be understood that the above disclosure is one example and does not necessarily describe every possible embodiment. As such, it will be further understood that alternate embodiments may include fewer, alternate, and/or additional steps or elements.

Exemplary Generative AI/ML Model Exchange Applications and Interfaces

Figure 3:
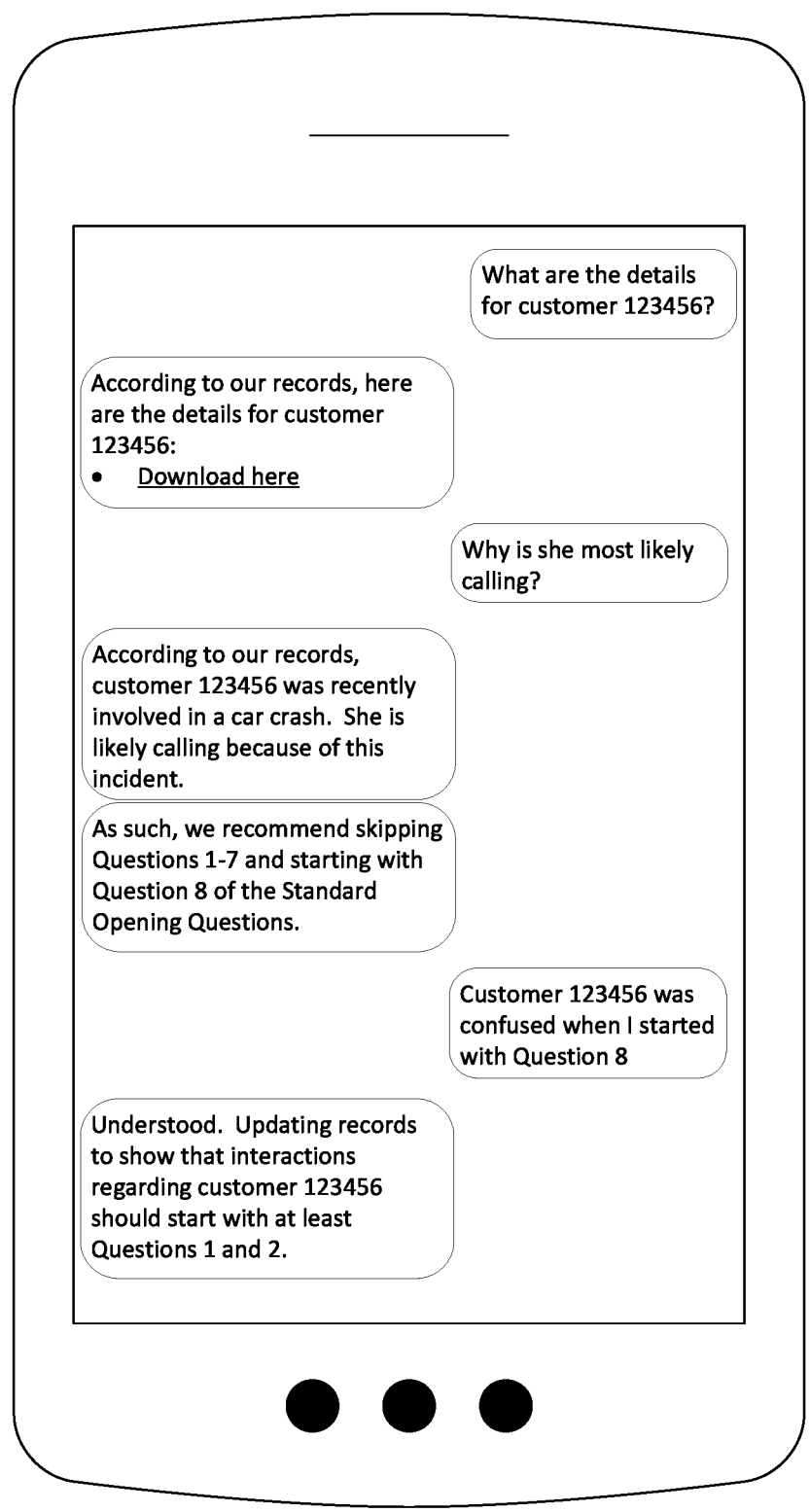
FIG. 3 depicts an exemplary interface with which a user interacts with an intelligence and/or machine learning model in a generative device as described with regard to FIG. 1.
Figure 4A:
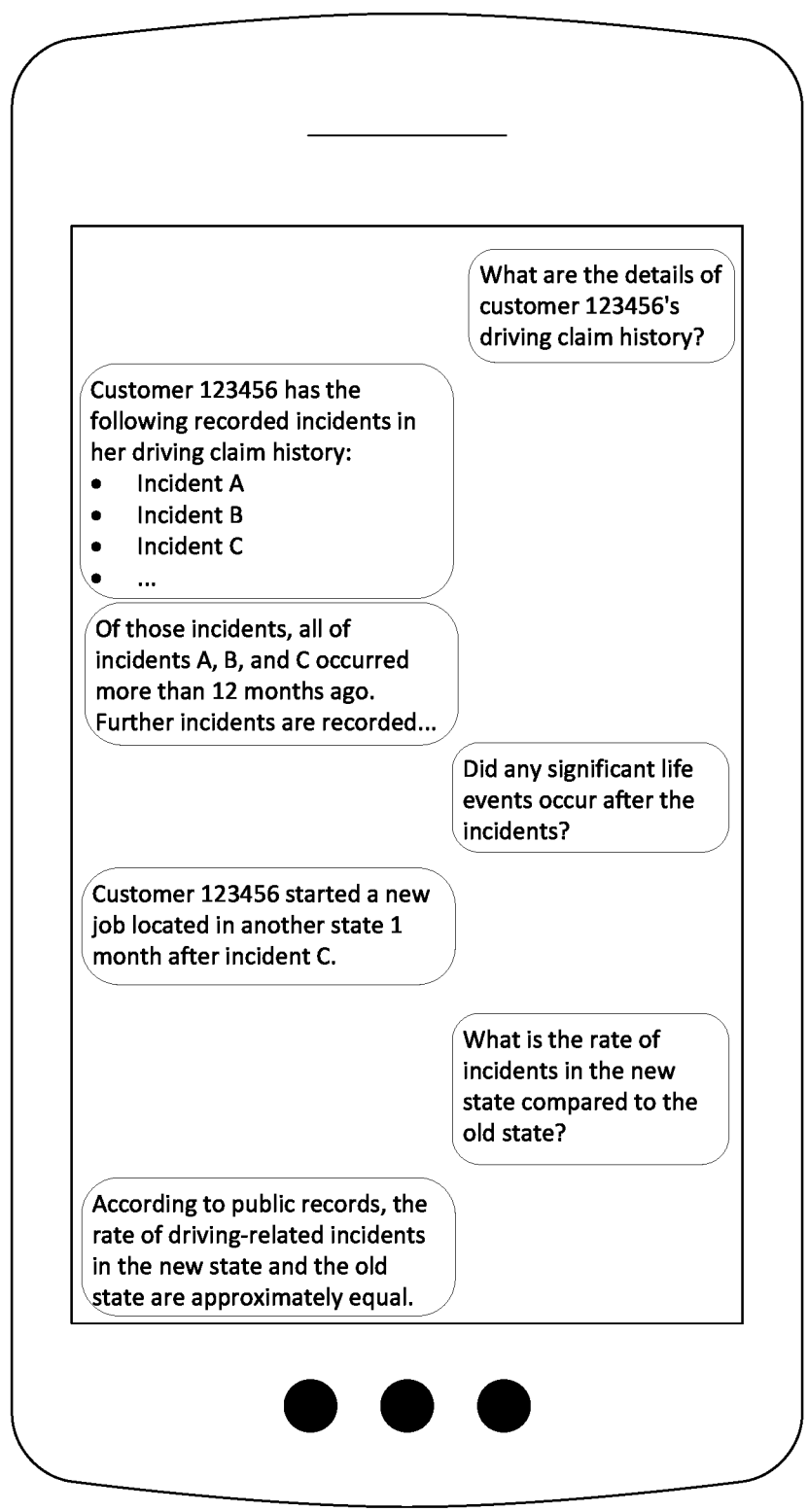
FIG. 4A depicts another exemplary interface with which a user interacts with an intelligence and/or machine learning model in a generative device as described with regard to FIG. 1.
Figure 4B:
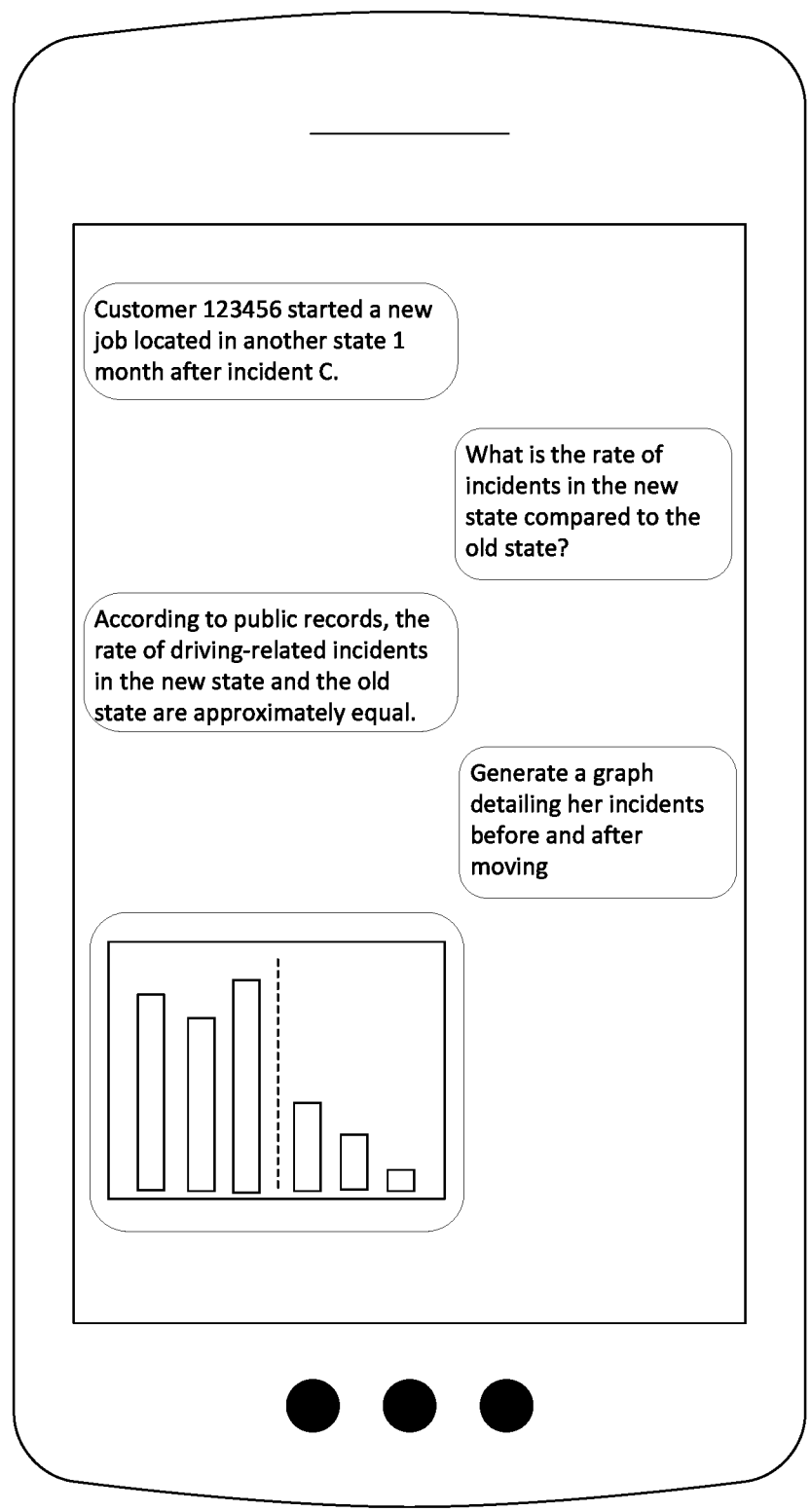
FIG. 4B depicts an extension of the exemplary interface as described with regard to FIG. 4A including a generated visual output associated with the dialogue.

FIGS. 3-4B illustrate exemplary interfaces for communicating with a generative AI and/or ML model. In particular, FIG. 3 illustrates an interface 300 that displays an exchange between a user and the generative AI and/or ML model. In particular, a user requests that the generative AI and/or ML model retrieve and analyze details for a customer from a customer database (e.g., user database 116). The generative AI and/or ML model may use a designated customer ID (e.g., 123456 in the exemplary embodiment of FIG. 3), a recorded name for a customer (e.g., Jane Doe), an identifying factor (e.g., a phone number, transaction number, incident number, etc.), and/or any other such identifiable information. Although FIG. 3 depicts such a process with regard to an ongoing customer interaction, it will be understood that an interface 300 may respond to similar queries and/or requests as otherwise detailed herein.

In some embodiments, the user starts the interaction by issuing a command to the generative AI and/or ML model. For example, in the exemplary interface 300, the user commands the generative AI and/or ML model to provide details related to a particular customer. Depending on the embodiment, the generative AI and/or ML model may determine that details for a particular customer would be useful to a user and may provide the details unprompted by the user (e.g., in response to a customer phone call, in response to a transfer of a customer from one line or department to another, etc.). In further embodiments, the user may prompt the generative AI and/or ML model with a spoken command rather than a text command.

The generative AI and/or ML model may then prepare details for the user to access. Depending on the embodiment, the generative AI and/or ML model may provide a list of details based upon the initial command from the user, based upon a context of the conversation (e.g., if the customer is calling, then reasons for the call may be provided), based upon an internal priority system, etc. In some embodiments, the generative AI and/or ML model may directly provide the list of details to the user or may provide a link for the user to access and/or download the results. Depending on the embodiment, the generative AI and/or ML model may provide the raw data, an analyzed and/or curated version of the data, only the data requested, etc.

The user may then provide an additional request for further analysis, curation, and/or summation by the generative AI and/or ML model. In the exemplary embodiment of FIG. 3, the user commands the generative AI and/or ML model to analyze the data and determine a reason why the customer is calling. Based upon the data accessible in the customer database, past customer data (generalized or specific), user preferences, etc. The generative AI and/or ML model may then analyze the relevant data and provide the results to the analysis to the user. In the exemplary embodiment of FIG. 3, the generative AI and/or ML model determines that the customer was involved in a car crash and is likely calling with regard to such.

In some embodiments, the generative AI and/or ML model may provide a recommendation to the user in response to a user prompt and/or in response to a determination regarding the context of the dialogue exchange. For example, in the exemplary embodiment of FIG. 3, the generative AI and/or ML model determines that the user can simplify the phone call with the customer by removing a number of unrelated questions from a standard exchange due to the reasons for calling, the data available, etc.

The user may then provide feedback regarding the information and/or recommendation. The generative AI and/or ML model may modify and/or update records, the model, and/or the customer database based upon the feedback. In the exemplary embodiment of FIG. 3, the user notes that the customer was confused by skipping the questions and the generative AI and/or ML model recommends questions to include for future interactions.

It will further be understood that the above disclosure is one example and does not necessarily describe every possible embodiment. As such, it will be further understood that alternate embodiments may include fewer, alternate, and/or additional steps or elements.

FIGS. 4A and 4B illustrate interfaces 400A and 400B that display an analysis of changes in claim history for a customer, access public information to determine reasoning behind such changes, and ultimately generate a visual representation of the changes in question. Depending on the embodiment, the exemplary interfaces 400A and 400B may resemble the exemplary interface 300 of FIG. 3, and relevant embodiments may similarly apply to FIGS. 4A and 4B.

In some embodiments, the generative AI and/or ML model may access additional databases besides a customer database (e.g., user database 116) to carry out a command or request from the user. For example, the generative AI and/or ML model may access public governmental databases to determine what may affect a customer and/or characteristics of a customer, such as environment, age, interaction data, etc. For example, in the exemplary interface 400A, the generative AI and/or ML model accesses public records to determine that moving to a new state is unlikely to affect a customer's driving capabilities substantially. Similarly, the generative AI and/or ML model may access such public information or internal information regarding the customer (e.g., public social media, public governmental databases, etc.) to determine potential factors that may impact the customer before analyzing the potential factors further (e.g., in response to a command by the user).

Further, the generative AI and/or ML model may generate a visual representation of information the generative AI and/or ML model provides to the user. For example, in the exemplary embodiment of FIG. 4B, the generative AI and/or ML model prepares and presents a graphical representation of incidents the user is involved with prior and after a predetermined life event.

Depending on the embodiment, the generative AI and/or ML model may generate a visual representation in response to a command from the user and/or without prompting. In some such embodiments, the generative AI and/or ML model determines that a visual representation is useful based upon the context, based upon past user interactions, based upon available information regarding the customer, etc.

It will further be understood that the above disclosure is one example and does not necessarily describe every possible embodiment. As such, it will be further understood that alternate embodiments may include fewer, alternate, and/or additional steps or elements.

Figure 5:
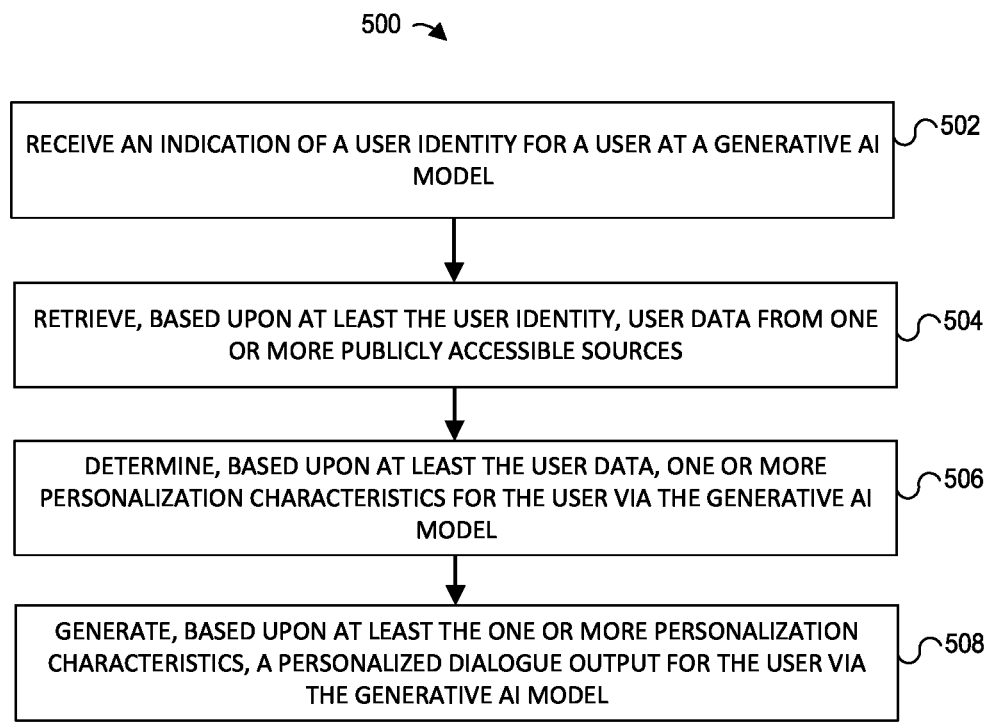
FIG. 5 depicts a flow diagram representing an exemplary computer-implemented method for using a generative artificial intelligence and/or machine learning model to analyze user telematics data.

Exemplary Computer-Implemented Method for Using A Generative Model to Analyze User Telematics Data FIG. 5 is a flow diagram of an exemplary computer-implemented method 500 for analyzing user telematics data. The method 500 may be implemented by one or more processors of a computing system such as a computing device representing user database 116 or mobile device 112. Alternatively or additionally, the method 500 may be implemented by one or more processors of a distributed system such as system 100 and/or various components of system 100 as described with regard to FIGS. 1 and/or 2 above, or otherwise implemented by one or more local or remote processors, servers, sensors, transceivers, memory units, wearables, smart contacts, smart glasses, virtual reality headsets, augmented reality glasses or headsets, mixed or extended reality headsets or glasses, voice or chat bots, ChatGPT bots, generative AI, and/or other electronic or electrical components, including those mentioned elsewhere herein.

At block 502, the generative AI or ML model may receive an indication of a user identity for a user at a generative AI or ML model. In some embodiments, the user identity may be or include a name, a customer number, an ID number, a product number, a helpdesk ticket number, a personal identification number, an address, a date of birth, a phone number, etc. In further embodiments, the generative AI or ML model determines a user identity automatically from a user action (e.g., a phone call from a number associated with the user, an email from an email associated with the user, an action from an account associated with the user, etc.).

At block 504, the generative AI or ML model may retrieve, based upon at least the user identity, user data from one or more publicly accessible sources. In some embodiments, the generative AI or ML model additionally or alternatively retrieves data from one or more private sources. Depending on the embodiment, the publicly accessible sources may include at least one of social media, a governmental database (e.g., a property database, a title recordation database, etc.), online posts by the user, etc. Similarly, the private sources may include at least one of private sources owned by an entity maintaining the generative AI or ML model, third-party databases, data provided by the user, etc.

At block 506, the generative AI or ML model may determine, based upon at least the user data, one or more personalization characteristics for the user via the generative AI or ML model. In some embodiments, the personalization characteristics for the user may be associated with an information retention rate for the user. For example, the generative AI or ML model may determine personalization characteristics (e.g., word choices, visual design choices, topic choices, etc.) that a user may be more likely to understand, retain, and/or act on.

In some embodiments, the generative AI or ML model may further receive a context associated with the dialogue (e.g., a particular task that the generative AI or ML model is to perform for the user). In such embodiments, the personalization characteristics may be or include characteristics associated with the context for the dialogue. For example, the personalization characteristics may include a personalized diet plan for the user (e.g., including carbs, proteins, fats, etc. to meet a goal), a personalized grocery list, instructions for the user to perform a task (e.g., personalized for the user's understanding and/or the user's particular needs). Similarly, the personalization characteristics may include goals for the user (e.g., as set by the user, an employer, a third-party entity, etc.), important messages for the user, performance results and/or information for the user, personalized insurance plans (e.g., for home insurance, car insurance, life insurance, etc.) for the user, health/wellness information and/or goals for the user, etc.

At block 508, the generative AI or ML model may generate, based upon at least the one or personalization characteristics, a dialogue output for the user via the generative AI model. In some embodiments, the dialogue output may include context for a user (e.g., to improve a user's understanding), simplified language, a reduced number of questions (e.g., for a survey), simplified questions for a user, determinations of what questions are useful for what demographic (e.g., retirement information may be more useful for an older demographic), etc. Depending on the embodiment, the dialogue output may include the personalization characteristics or be generated based upon the personalization characteristics. For example, the dialogue output may directly include the personalization characteristics in question (e.g., health information for the user) or may be a plan based upon the personalization characteristics (e.g., a proposed weight loss plan based upon the health information without actually displaying the health information to a user).

Similarly, the dialogue output may include a score based upon user data and/or personalization characteristics. For example, the generative AI or ML model may include an indication of a driver score, home score, interaction score, etc. associated with the user and may offer recommendations for improving such a score. For example, the generative AI or ML model may offer driving tips, home security tips, tips regarding potentially beneficial interactions (e.g., potential networking events), etc.

Although the description herein generally refers to a "dialogue output", it will be understood that such a dialogue output may be inclusive of text outputs, voice outputs, visual outputs, gesture outputs, etc. For example, when generating and/or facilitating an underwriting analysis, a claim filing procedure, or answers regarding one or more questions, the generative AI or ML model may provide such via a generated voice feature and may similarly receive inputs or commands via such a voice feature.

In still further embodiments, the dialogue output may include an agenda, lists of tasks, lists of personnel (e.g., to find people interested in and/or skilled in something), an expected sentiment for a proposed change or campaign, a prediction of how a message will be received, experience of individuals and/or teams, pain points for departments, deadlines missed, product or project recommendations, backlog of prioritized items, work to be prioritized, a determination of who stakeholders should be for a project, key features and/or functionalities of a project, expected cost of a project, a receipt for an ordered inventory, a simplified training program, a tailored goal for an employee, a comprehensive study of work by a team, retirement planning information, step-by-step instructions understandable to a user to explain a process, etc.

Depending on the embodiment, the dialogue output may include a personalized modification, (e.g., a discount or surcharge) for a charge (e.g., an insurance premium) based upon the user data. In further embodiments in which the generative AI or ML model determines interaction data for a user, such a dialogue output may further be based upon the interaction data. In still further embodiments, the dialogue output may include a summary of one or more predetermined call topics personalized to relate to, be useful for, and/or answer questions for the user.

In still further embodiments, the personalized dialogue output may include one or more visuals depicting the personalization characteristics (e.g., a graph displaying one or more impact factors on a user's rating or score), one or more audio cues (e.g., a vocal answer to the user's question) based upon the personalization characteristics, etc. In some embodiments, the one or more visuals include one or more personalized products that the generative AI or ML model determines would benefit the user. In further embodiments, the personalized dialogue output includes an explanation as to why the generative AI or ML model determines that a product would benefit a user and/or one or more selling points for the product as the product relates to the user.

In some embodiments, the method 500 may further include retrieving, based upon the user identity, interaction data between the user and one or more other individuals. Depending on the embodiment, the generative AI or ML model may retrieve the interaction data from one or more publicly or privately accessible sources as described above. Similarly, determining the one or more personalization characteristics may then be based upon the interaction data.

In further embodiments, the method 500 may further include determining whether the user tends to make good decisions and offer personalized dialogue output based upon such. For example, the personalized dialogue output may include advice, potential products to help with common problems, recommended learning modules, a discount based upon good decision making, etc. As noted elsewhere, the voice bot, chatbot, ChatGPT-based bot, ChatGPT bot, and/or other bots may generate audible or verbal output, text or textual output, visual or graphical output, output for use with speakers and/or display screens, and/or other types of output for user and/or other computer or bot consumption.

It will be understood that the above disclosure is one example and does not necessarily describe every possible embodiment. As such, it will be further understood that alternate embodiments may include fewer, alternate, and/or additional steps or elements.

With the foregoing, a user may opt-in to a rewards, insurance discount, or other type of program. After the user provides their affirmative consent, an insurance provider remote server may collect data from the user's mobile device, smart home device, smart vehicle, wearables, smart glasses, smart contacts, smart watch, augmented reality glasses, virtual reality headset, mixed or extended reality headset or glasses, voice or chat bots, ChatGPT bots, and/or other smart devices-such as with the customer's permission or affirmative consent. The data collected may be related to smart home functionality, accident data, and/or insured assets before (and/or after) an insurance-related event, including those events discussed elsewhere herein. In return, risk averse insureds, home owners, or home or apartment occupants may receive discounts or insurance cost savings related to home, renters, auto, personal articles, and other types of insurance from the insurance provider.

In one aspect, smart or interconnected home data, user data, and/or other data, including the types of data discussed elsewhere herein, may be collected or received by an insurance provider remote server, such as via direct or indirect wireless communication or data transmission from a smart home device, mobile device, smart vehicle, wearable, smart glasses, smart contacts, smart watch, augmented reality glasses, virtual reality headset, mixed or extended reality glasses or headset, voice bot, chat bot, ChatGPT bot, and/or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, vehicles, or renter belongings, and/or (ii) home or apartment renters and/or occupants.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to owners of properties, through the principles disclosed herein. Therefore, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed:

1. A computer-implemented method for analyzing user data, the computer-implemented method comprising:
determining, by one or more processors, a user identity for a user at a generative artificial intelligence (AI) model based upon a user action;
retrieving, by the one or more processors and based upon at least the user identity, user data from at least one of one or more publicly accessible sources or one or more privately accessible sources;
determining, by the one or more processors and based upon at least the user data, one or more personalization characteristics associated with at least an information retention rate for the user via the generative AI model, wherein:
the information retention rate is indicative of a baseline rate for user understanding of information, and
the one or more personalization characteristics are predicted to affect the user understanding of the information based upon the information retention rate; and
generating, by the one or more processors, a personalized dialogue output for the user via the generative AI model, the personalized dialogue output including a plan based upon at least the one or more personalization characteristics.

2. The computer-implemented method of claim 1, the computer-implemented method further comprising:
retrieving, by the one or more processors and based upon at least the user identity, interaction data between the user and one or more other individuals from the one or more publicly accessible sources;
wherein determining the one or more personalization characteristics is further based upon at least the interaction data.

3. The computer-implemented method of claim 2, wherein the personalized dialogue output for the user includes a personalized modification to an insurance premium based upon at least one of the user data or the interaction data.

4. The computer-implemented method of claim 1, wherein the user action includes at least one of (i) a phone call, (ii) a video call, (iii) a text message, or (iv) an email, and the plan includes an indication to provide, to the user, a summary of one or more predetermined call topics, wherein the summary is personalized to relate to the user.

5. The computer-implemented method of claim 1, wherein the personalized dialogue output for the user includes one or more visuals depicting the one or more personalization characteristics and generated by the generative AI model.

6. The computer-implemented method of claim 1, wherein the personalized dialogue output for the user includes one or more audio cues, wherein the one or more audio cues are based upon at least the one or more personalization characteristics and generated by the generative AI model.

7. The computer-implemented method of claim 1, wherein the one or more publicly accessible sources includes at least one of (i) social media, (ii) governmental databases, or (iii) online posts by the user.

8. The computer-implemented method of claim 1, wherein the generative AI model includes at least one of: (i) an AI or machine learning (ML) chatbot or (ii) an AI or ML voice bot.

9. A computer system for analyzing user data, the computer system comprising:
one or more processors;
a communication unit; and a non-transitory computer-readable medium coupled to the one or more processors and the communication unit and storing instructions thereon that, when executed by the one or more processors, cause the computer system to:
- determine a user identity for a user at a generative artificial intelligence (AI) model based upon a user action;
- retrieve, based upon at least the user identity, user data from at least one of one or more publicly accessible sources or one or more privately accessible sources;
- determine, based upon at least the user data, one or more personalization characteristics associated with at least an information retention rate for the user via the generative AI model, wherein:
  - the information retention rate is indicative of a baseline rate for user understanding of information, and
  - the one or more personalization characteristics are predicted to affect the user understanding of the information based upon the information retention rate; and
- generate a personalized dialogue output for the user via the generative AI model, the personalized dialogue output including a plan based upon at least the one or more personalization characteristics.

10. The computer system of claim 9, wherein the non-transitory computer-readable medium further stores instructions that, when executed by the one or more processors, cause the computer system to:
- retrieve, based upon at least the user identity, interaction data between the user and one or more other individuals from the one or more publicly accessible sources;
- wherein determining the one or more personalization characteristics is further based upon at least the interaction data.

11. The computer system of claim 10, wherein the personalized dialogue output for the user includes a personalized modification to an insurance premium based upon at least one of the user data or the interaction data.

12. The computer system of claim 9, wherein the user action includes at least one of (i) a phone call, (ii) a video call, (iii) a text message, or (iv) an email, and the plan includes an indication to provide, to the user, a summary of one or more predetermined call topics, wherein the summary is personalized to relate to the user.

13. The computer system of claim 9, wherein the personalized dialogue output for the user includes one or more visuals depicting the one or more personalization characteristics and generated by the generative AI model.

14. The computer system of claim 9, wherein the personalized dialogue output for the user includes one or more audio cues, wherein the one or more audio cues are based upon at least the one or more personalization characteristics and generated by the generative AI model.

15. The computer system of claim 9, wherein the one or more publicly accessible sources includes at least one of (i) social media, (ii) governmental databases, or (iii) online posts by the user.

16. The computer system of claim 9, wherein the generative AI model includes at least one of: (i) an AI or machine learning (ML) chatbot or (ii) an AI or ML voice bot.

17. A tangible, non-transitory computer-readable medium storing instructions for analyzing user data that, when executed by one or more processors of a computing device, cause the computing device to:
- determine a user identity for a user at a generative artificial intelligence (AI) model based upon a user action;
- retrieve, based upon at least the user identity, user data from at least one of one or more publicly accessible sources or one or more privately accessible sources;
- determine, based upon at least the user data, one or more personalization characteristics associated with at least an information retention rate for the user via the generative AI model, wherein:
  - the information retention rate is indicative of a baseline rate for user understanding of information, and
  - the one or more personalization characteristics are predicted to affect the user understanding of the information based upon the information retention rate; and
- generate a personalized dialogue output for the user via the generative AI model, the personalized dialogue output including a plan based upon at least the one or more personalization characteristics.

18. The tangible, non-transitory computer-readable medium of claim 17, the instructions further including instructions that, when executed, cause the computing device to:
- retrieve, based upon at least the user identity, interaction data between the user and one or more other individuals from the one or more publicly accessible sources;
- wherein determining the one or more personalization characteristics is further based upon at least the interaction data.

19. The tangible, non-transitory computer-readable medium of claim 18, wherein the personalized dialogue output for the user includes a personalized modification to an insurance premium based upon at least one of the user data or the interaction data.

20. The tangible, non-transitory computer-readable medium of claim 17, wherein the user action includes at least one of (i) a phone call, (ii) a video call, (iii) a text message, or (iv) an email, and the plan includes an indication to provide, to the user, a summary of one or more predetermined call topics, wherein the summary is personalized to relate to the user.

* * * * *